United States Patent
Adachi et al.

(10) Patent No.: US 7,354,460 B2
(45) Date of Patent: Apr. 8, 2008

(54) METHOD FOR MANUFACTURING CORE MATERIAL FOR ELECTRODE PLATE AND METHOD FOR MANUFACTURING ALKALINE STORAGE BATTERY

(75) Inventors: Atsushi Adachi, Kosai (JP); Kazuyuki Kusama, Toyohashi (JP); Michio Ozawa, Toyohashi (JP); Nobuyasu Morishita, Toyohashi (JP); Masaru Kobayashi, Toyohashi (JP)

(73) Assignees: Matsushita Electric Industrial Co., Ltd., Osaka (JP); Toyota Jidosha Kabushiki Kaisha, Aichi (JP)

( * ) Notice: Subject to any disclaimer, the term of this patent is extended or adjusted under 35 U.S.C. 154(b) by 518 days.

(21) Appl. No.: 10/503,021

(22) PCT Filed: Jun. 9, 2003

(86) PCT No.: PCT/JP03/07299

§ 371 (c)(1),
(2), (4) Date: Jul. 28, 2004

(87) PCT Pub. No.: WO03/105256

PCT Pub. Date: Dec. 18, 2003

(65) Prior Publication Data

US 2005/0115037 A1    Jun. 2, 2005

(30) Foreign Application Priority Data

Jun. 10, 2002 (JP) .............................. 2002-169045
Mar. 13, 2003 (JP) .............................. 2003-068806

(51) Int. Cl.
H01M 4/26 (2006.01)
H01M 4/66 (2006.01)

(52) U.S. Cl. .............................. 29/623.1; 29/2; 429/245

(58) Field of Classification Search ..................... None
See application file for complete search history.

(56) References Cited

U.S. PATENT DOCUMENTS 4,663,256 A    5/1987 Corrigan
6,153,077 A    11/2000 Kato et al.

FOREIGN PATENT DOCUMENTS

| EP | 0 860 518 |   | 8/1998 |
|----|-----------|---|--------|
| JP | 51-086031 | * | 7/1976 |
| JP | 10-001763 | * | 1/1998 |
| JP | 2000-223116 |   | 8/2000 |
| WO | 98/53512  |   | 11/1998 |

* cited by examiner

*Primary Examiner*—Jonathan Crepeau
(74) *Attorney, Agent, or Firm*—Hamre, Schumann, Mueller & Larson, P.C.

(57) ABSTRACT

A plate core material is manufactured by a method including the processes of soaking a core material (11) that is made of nickel or nickel-plated steel and includes copper as an impurity in an aqueous solution (12) containing ammonium ions and hydrogen peroxide, so that the copper is dissolved in the aqueous solution (12), and removing the aqueous solution (12) from the surface of the core material (11). Further, an alkaline storage battery is manufactured by a method including this manufacturing method. According to the manufacturing method of the present invention, an alkaline storage battery having higher reliability than that of a conventional alkaline storage battery can be obtained.

8 Claims, 13 Drawing Sheets

METHOD FOR MANUFACTURING CORE MATERIAL FOR ELECTRODE PLATE AND METHOD FOR MANUFACTURING ALKALINE STORAGE BATTERY

TECHNICAL FIELD

The present invention relates to a method for manufacturing a plate core material of alkaline storage batteries and a method for manufacturing an alkaline storage battery.

BACKGROUND ART

Conventionally, alkaline storage batteries such as a nickel-cadmium storage battery and a nickel metal hydride storage battery have been used as power sources for a mobile phone, a personal computer, and the like. Further, in recent years, nickel metal hydride storage batteries are used as a power source for a motor of an electric vehicle or a hybrid electric vehicle. Positive electrodes of such alkaline storage batteries broadly are classified into sintered positive electrodes and non-sintered positive electrodes. In the non-sintered positive electrodes, a conductive core material that is made of nickel or nickel-plated steel has been used.

However, such a core material may include a metal (such as copper) other than nickel or iron as an impurity. When a large amount of impurity is included, the impurity dissolved in an electrolyte solution from the core material is deposited and the deposited metal may develop a minute short circuit in positive and negative electrodes.

DISCLOSURE OF INVENTION

In view of such a situation, an object of the present invention is to provide a method for manufacturing a plate core material that can configure an alkaline storage battery having higher reliability than that of a conventional alkaline storage battery, and a method for manufacturing an alkaline storage battery using the same.

In order to achieve the above-mentioned object, a method for manufacturing a plate core material of an alkaline storage battery according to the present invention includes: (i) bringing a core material that is made of nickel or nickel-plated steel and includes copper as an impurity into contact with an aqueous solution containing ammonium ions and hydrogen peroxide, so that the copper is dissolved in the aqueous solution; and (ii) removing the aqueous solution from a surface of the core material. In the present description, "steel" is a general ferrous material including not only carbon steel but also pure iron, stainless steel, and the like.

Further, a method for manufacturing an alkaline storage battery having a positive electrode including a core material and an active material carried by the core material according to the present invention includes manufacturing the core material using the above-mentioned method for manufacturing a plate core material according to the present invention.

BEST MODE FOR CARRYING OUT THE INVENTION

Hereinafter, embodiments of the present invention will be described.

Embodiment 1

In Embodiment 1, a method for manufacturing a plate core material of an alkaline storage battery according to the present invention will be described.

Figure 1:
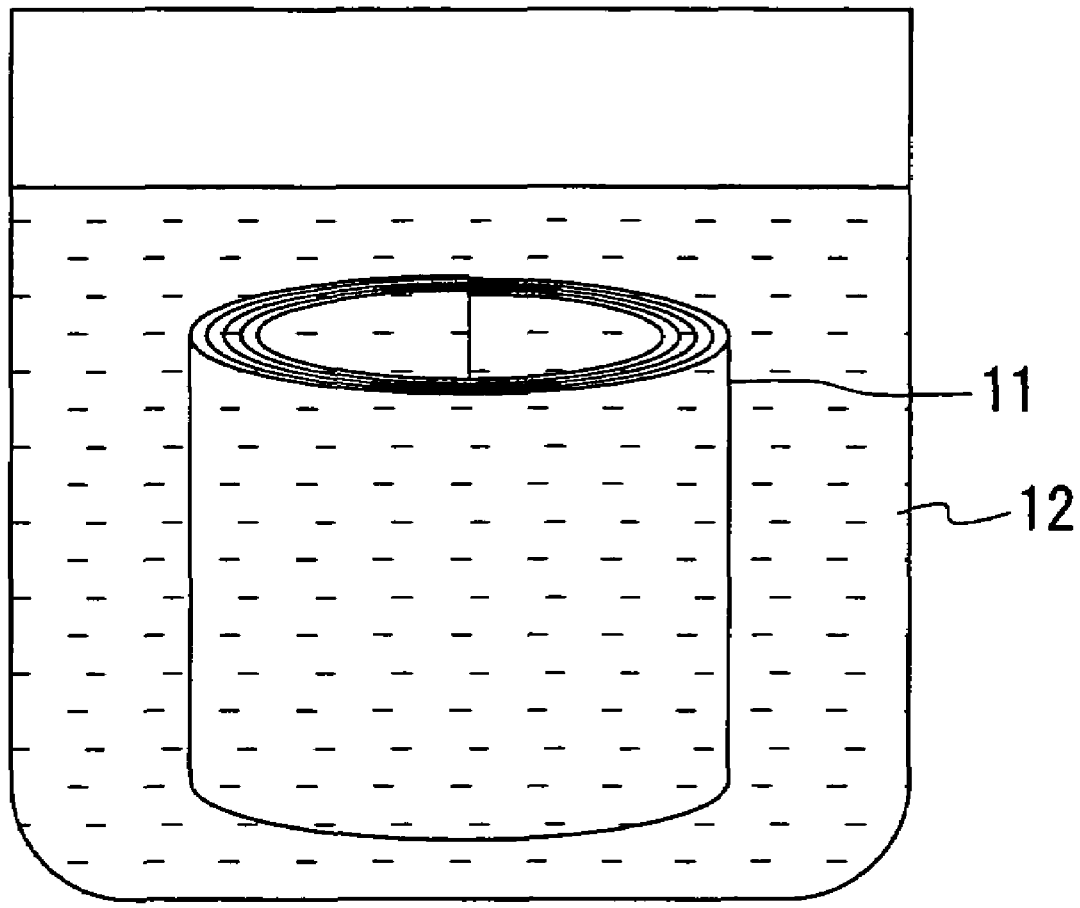
FIG. 1 is a schematic diagram showing a process in a method for manufacturing a plate core material of the present invention.

In the manufacturing method of Embodiment 1, first, a core material that is made of nickel or nickel-plated steel and includes copper as an impurity is brought into contact with an aqueous solution containing ammonium ions ($NH_4^+$) and hydrogen peroxide ($H_2O_2$), so that the copper is dissolved in the aqueous solution (Process (i)). More specifically, as shown in FIG. 1, a core material 11 that is made of nickel or nickel-plated steel and includes copper as an impurity is soaked in an aqueous solution 12 containing ammonium ions and hydrogen peroxide, so that the copper is dissolved in the aqueous solution 12.

Figure 2A:
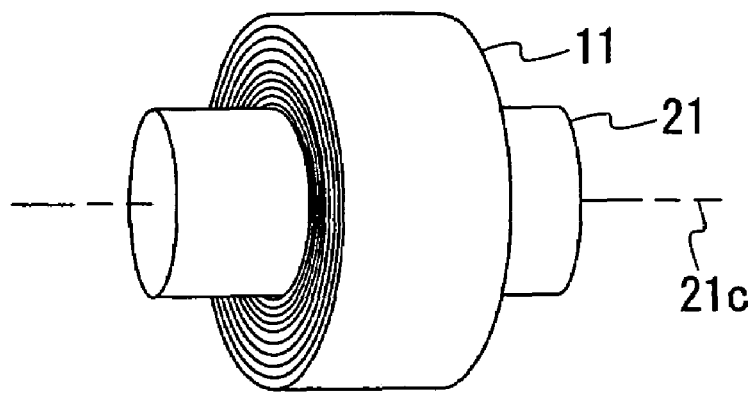
FIGS. 2A and 2B are schematic diagrams showing another process in the method for manufacturing a plate core material of the present invention.
Figure 2B:
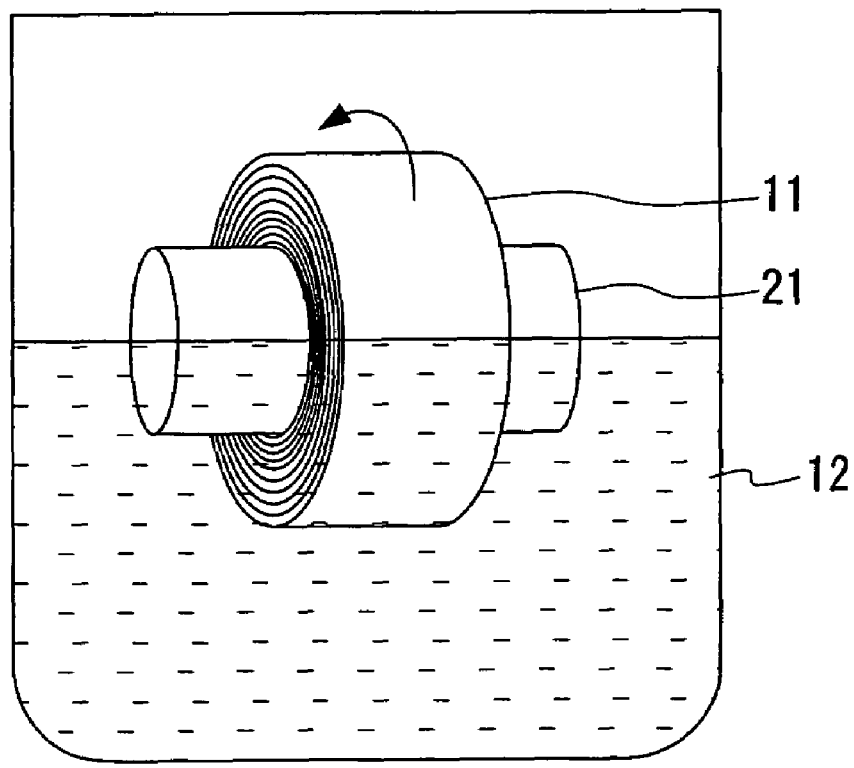

The core material 11 may be coiled around a roller 21 as shown in FIG. 2A and then be subjected to Process (i). In this case, it is preferable that the roller 21 is rotated in a state where the roller 21 is arranged such that a central axis 21c (see FIG. 2A) of the roller 21 is horizontal to the surface of the aqueous solution 12 and a portion of the core material 11 is soaked in the aqueous solution 12 as shown in FIG. 2B. Because of this, the fluidity of the aqueous solution 12 on the surface of the core material 11 can be enhanced, and consequently, dissolution of copper is accelerated.

As the core material 11, a material generally used as a core material for an alkaline storage battery, e.g., a nickel porous body such as foamed nickel and a sintered porous substrate, punching metal, and the like can be used. Foamed nickel usually is made of nickel. A sintered porous substrate usually is obtained by coating a nickel-plated iron substrate (steel sheet) with a nickel powder and sintering it. Punching metal usually is made of nickel-plated iron (such as steel). However, such commercially-available core materials may include copper as an impurity. These core materials may include copper because the copper may be previously included in nickel or iron as a material, or the copper in the form of dust may be attached to the material. In the manufacturing method of Embodiment 1, copper as an impurity is removed by being dissolved in the aqueous solution. The dissolution rate of nickel in the aqueous solution 12 is sufficiently slow compared with that of copper.

Ammonium ions in the aqueous solution 12 can be provided by dissolving ammonia or an ammonium compound in the aqueous solution. For example, at least one selected from the group consisting of ammonia, ammonium chloride, and ammonium acetate may be dissolved in the aqueous solution. It is preferable that the aqueous solution 12 has an ammonia concentration of 10 mass % to 27 mass % and a hydrogen peroxide concentration of 2 mass % to 20 mass %.

A higher temperature of the aqueous solution 12 achieves a higher dissolution rate of copper. However, when the temperature of the aqueous solution 12 is too high, bumping occurs. Thus, it is preferable that the temperature of the aqueous solution 12 is kept in the range of 10° C. to 30° C. A preferred range of time for soaking the core material 11 in the aqueous solution 12 is varied depending upon the concentration or temperature of the aqueous solution 12, e.g., about 10 minutes to 1 hour.

After the core material 11 is treated with the aqueous solution 12, the aqueous solution 12 is removed from the surface of the core material 11 (Process (ii)). To be specific, the core material 11 may be washed and dried. Washing can be performed with pure water or the like, for example.

Figure 3:
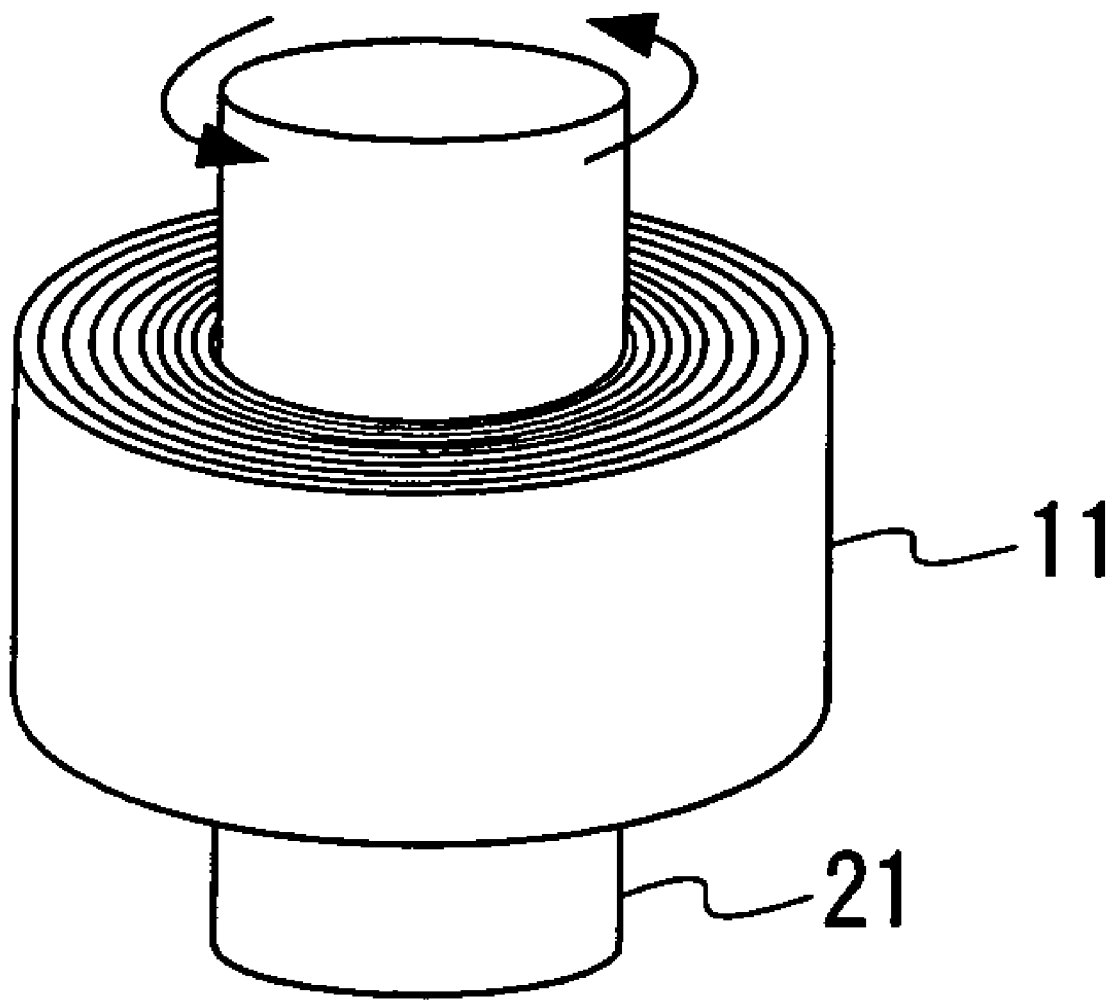
FIG. 3 is a schematic diagram showing still another process in the method for manufacturing a plate core material of the present invention.

Drying can be performed with hot air, in the atmosphere, under vacuum, or the like. Further, drying also can be performed using a centrifugal dehydration method. For example, as shown in FIG. 3, the core material 11 coiled around the roller 21 may be rotated at high speed. Because of this, most of the rinsing liquid (such as pure water) attached to the surface of the core material 11 can be removed. In this case, when a centrifugal force becomes too strong, the core material 11 may be damaged. Thus, it is preferable that the maximum value of the centrifugal force applied to the core material 11 is kept in the range of 100 G to 800 G. Thereafter, the core material 11 can be dried by, for example, blowing hot air thereto. Alternatively, the core material 11 may be dried in the atmosphere after high-temperature water vapor is sprayed thereto. Using such methods, drying of the core material 11 can be accelerated.

A core material can be manufactured in this manner. This core material can be used as a support for a positive electrode of an alkaline storage battery. This support also serves as a collector.

According to the manufacturing method of Embodiment 1, copper included in the core material can be removed. Therefore, when an alkaline storage battery is manufactured using the core material manufactured by this manufacturing method, a short circuit in positive and negative electrodes can be prevented. According to the manufacturing method of Embodiment 1, copper particles included in the core material as impurities can be removed or reduced to an amount developing no minute short circuit.

The description has been given of the method in which the coiled core material is soaked in the aqueous solution with reference to FIGS. 1 and 2B. However, the method of the present invention is not limited thereto. For example, a strip-shaped core material may be soaked in the aqueous solution by conveying and moving the core material in the aqueous solution.

A manufacturing device for use in the manufacturing method of Embodiment 1 includes a case in which the aqueous solution 12 is provided and means for bringing the core material 11 into contact with the aqueous solution 12. A specific example will be shown in Example 3. This device may further include means for removing the aqueous solution 12 from the surface of the core material 11, such as washing means and drying means.

Embodiment 2

In Embodiment 2, an alkaline storage battery of the present invention and a method for manufacturing the same will be described. The alkaline storage battery manufactured by the manufacturing method of Embodiment 2 may be a nickel-cadmium storage battery or a nickel metal hydride storage battery.

In the manufacturing method of Embodiment 2, a core material is manufactured using the manufacturing method described in Embodiment 1. Then, the obtained core material is filled or coated with paste containing an active material, and it is dried and rolled, resulting in a positive electrode. The active material is selected according to the battery to be manufactured. In the case of a nickel-cadmium storage battery or a nickel metal hydride storage battery, an active material containing nickel hydroxide as the main component is used. In the manufacturing method of the present invention, the alkaline storage battery is manufactured using the positive electrode thus obtained.

A well-known method for manufacturing an alkaline storage battery can be used except for the process for manufacturing the core material of the positive electrode. For example, a negative electrode can be formed by applying paste containing a hydrogen storing alloy or the like to punching metal, and drying and rolling it. Then, the positive and negative electrodes are laminated or wound with a separator therebetween, resulting in a plate group. The plate group and an electrolyte solution are sealed in a case, whereby the alkaline storage battery can be obtained.

In the manufacturing method of Embodiment 2, since the battery is produced using the core material including little copper, a short circuit in the positive and negative electrodes, due to copper deposited in the battery, can be prevented. Consequently, according to the manufacturing method of Embodiment 2, an alkaline storage battery having higher reliability than that of an alkaline storage battery manufactured by a conventional method can be manufactured. Such an alkaline storage battery is suitable as a battery expected to be used for a long period of time, such as a battery for use in an electric vehicle or a hybrid electric vehicle equipped with an engine or a fuel cell.

EXAMPLES

Hereinafter, the present invention will be described in further detail by way of examples.

Example 1

In Example 1, a description will be given of experiments in which the rate at which copper is dissolved in the aqueous solution described in Embodiment 1 was measured under different conditions.

Figure 4:
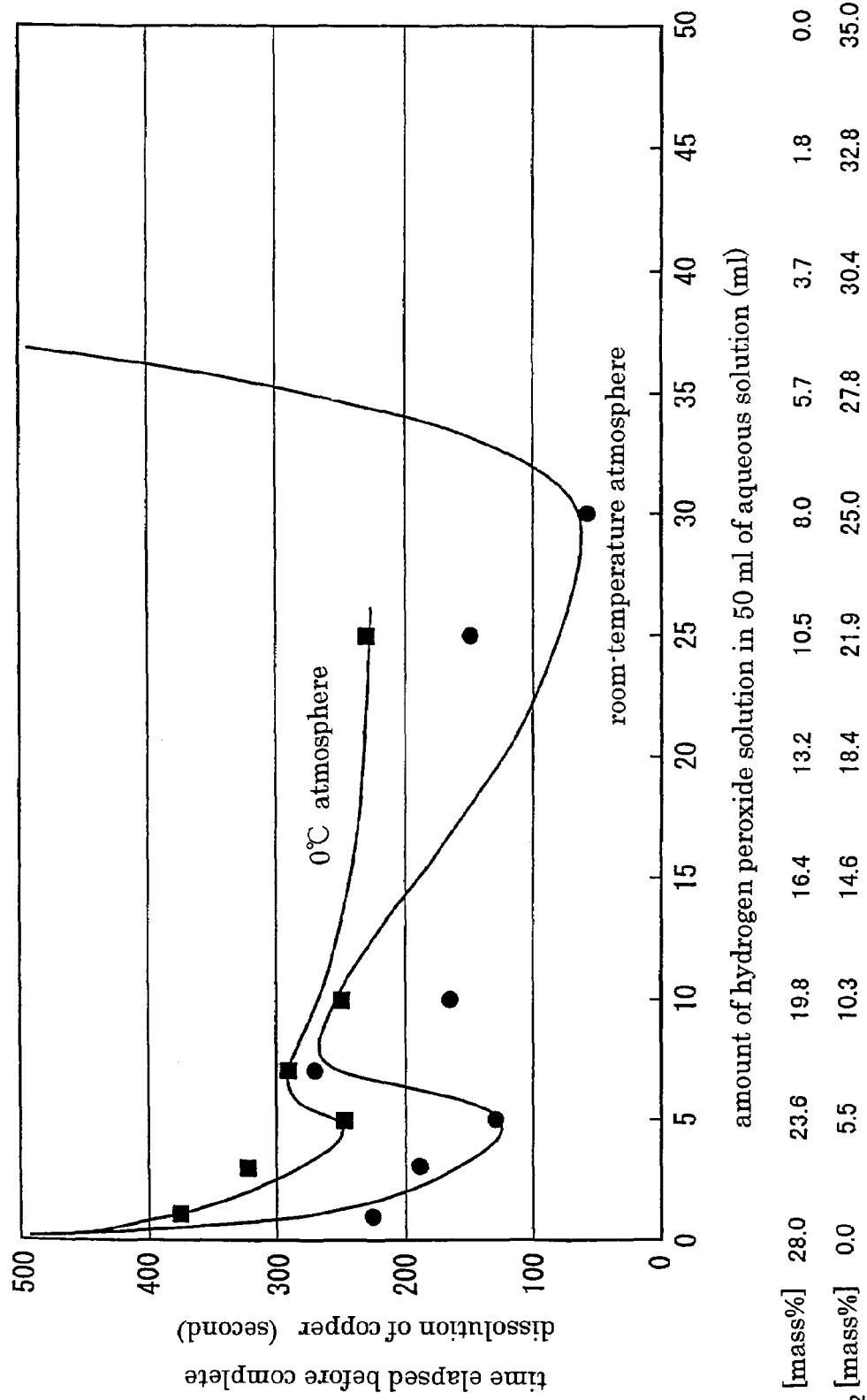
FIG. 4 is a diagram showing the relationship between the mixing ratio in an aqueous solution used in the manufacturing method of the present invention and the dissolution rate of copper.

First, 50 ml of aqueous solutions in which aqueous ammonia of 28 mass % and a hydrogen peroxide solution of 35 mass % are mixed at various ratios were used. Beakers containing the aqueous solutions were disposed in a 0° C. atmosphere or a room-temperature atmosphere. Then, 1 mg of copper was put into the aqueous solutions, and the time that elapsed before complete dissolution of the copper was measured. The results of the measurements are shown in FIG. 4. In the figure, the concentrations of $NH_3$ and $H_2O_2$ in the respective aqueous solutions also are shown.

In FIG. 4, a horizontal scale of 5 ml indicates an aqueous solution in which 45 ml of aqueous ammonia and 5 ml of hydrogen peroxide solution are mixed. As shown in FIG. 4, the dissolution rate of copper was high when an aqueous solution in which aqueous ammonia of 28 mass % and a hydrogen peroxide solution of 35 mass % are mixed approximately at the ratio of 9 to 1 by volume was used. When 25 ml or less of hydrogen peroxide solution was mixed (mixing ratio of 5:5), the dissolution rate of copper was much higher in the aqueous solutions disposed in a room-temperature atmosphere than in a 0° C. atmosphere. However, when more than 30 ml of hydrogen peroxide solution was mixed, the dissolution rate of copper became lower in the aqueous solutions disposed in a room-temperature atmosphere because bumping occurred with a rise in temperature of the aqueous solutions.

Example 2

In Example 2, a description will be given of experiments in which the relationship between the temperature of an aqueous solution and the dissolution rate of copper was evaluated.

Figure 5:
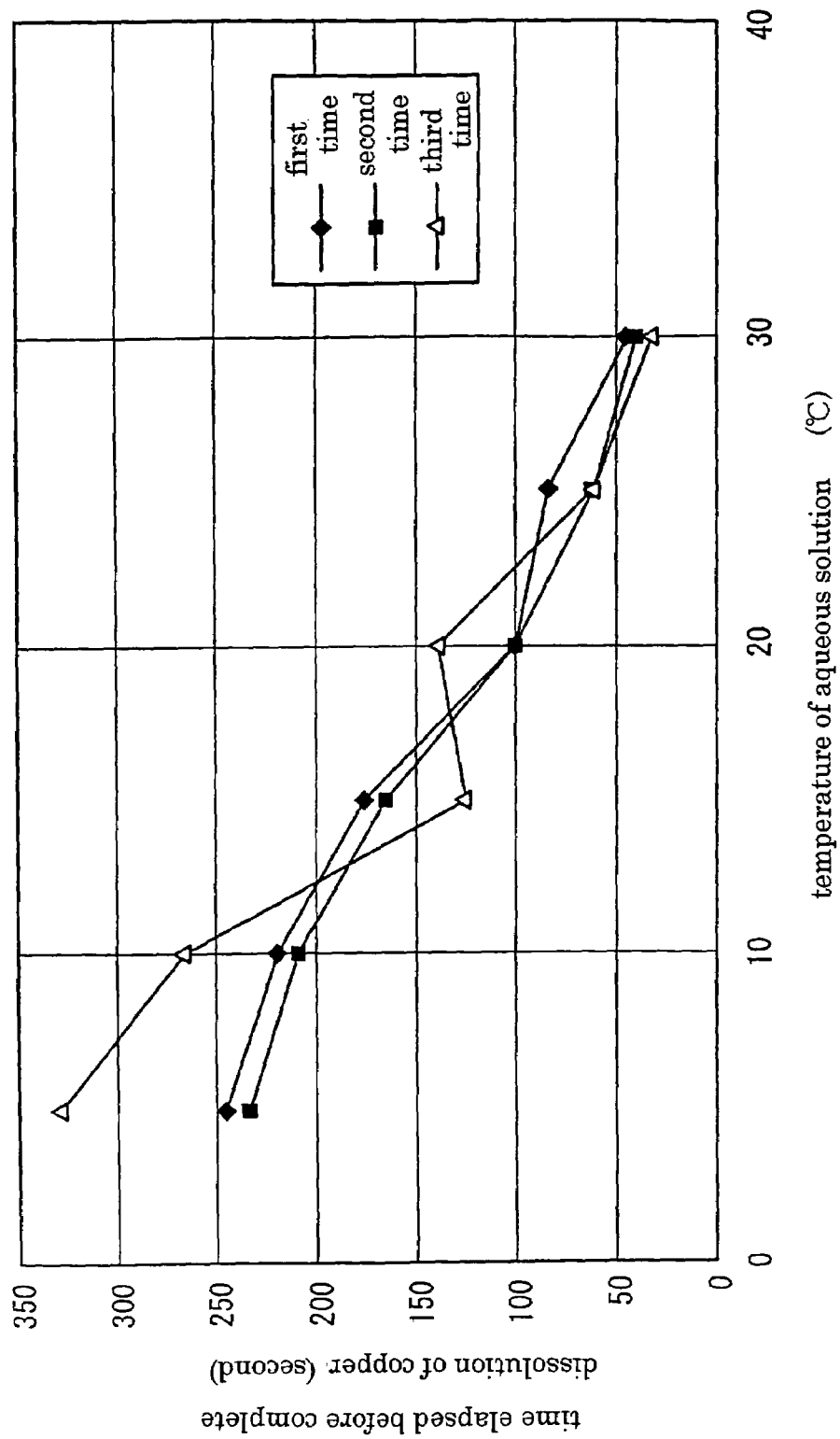
FIG. 5 is a diagram showing the relationship between the temperature of an aqueous solution used in the manufacturing method of the present invention and the dissolution rate of copper.

An aqueous solution in which aqueous ammonia of 28 mass % and a hydrogen peroxide solution of 35 mass % are mixed at the ratio of 9 to 1 by volume was used. The temperature of the aqueous solution was fixed at 5° C., 10° C., 15° C., 20° C., 25° C., or 30° C., and the time that elapsed before complete dissolution of 1 mg of copper was measured. The measurements were performed three times. The results of the measurements are shown in FIG. 5. As is apparent from FIG. 5, a higher temperature of an aqueous solution achieved a higher dissolution rate of copper. However, when the temperature is too high, bumping may occur with a sharp rise in temperature. On this account, it is preferable that the temperature of the aqueous solution is about 10° C. to 30° C.

Figure 6:
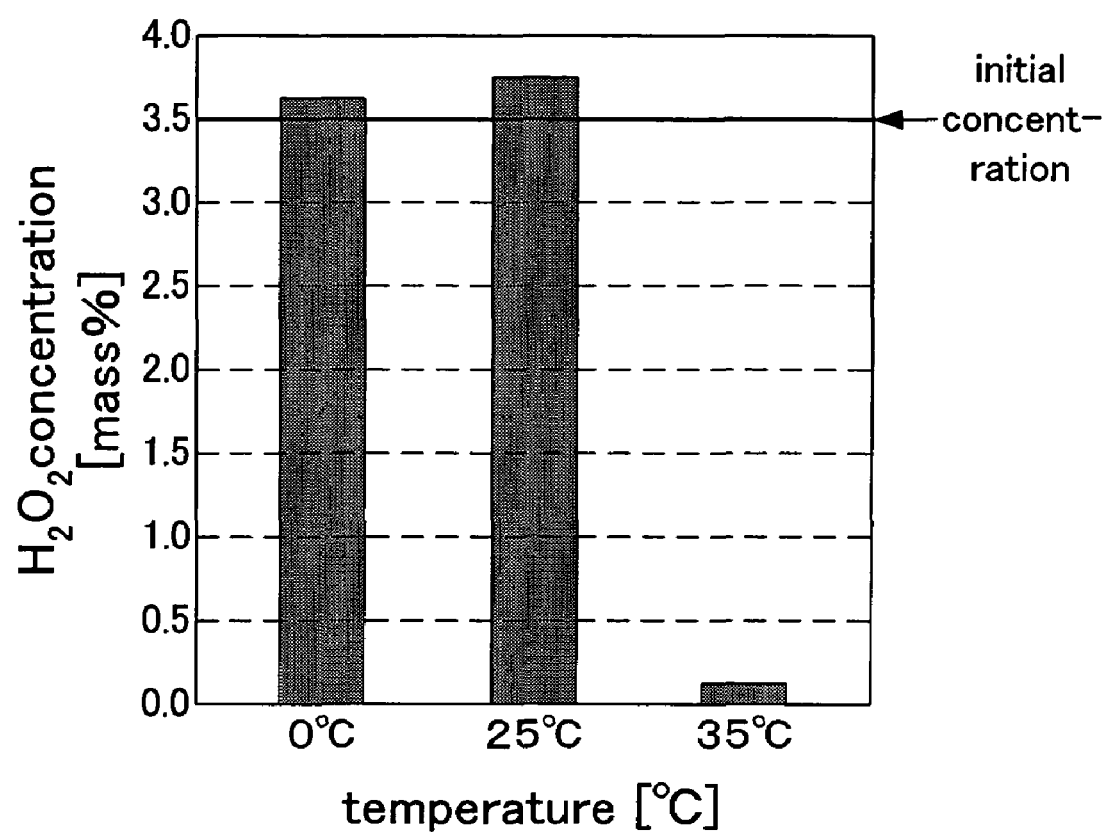
FIG. 6 is a diagram showing the relationship between the temperature of an aqueous solution used in the manufacturing method of the present invention and the $H_2O_2$ concentration after the aqueous solution is allowed to stand for 24 hours.

Further, an aqueous solution in which aqueous ammonia of 28 mass % and a hydrogen peroxide solution of 35 mass % are mixed at the ratio of 9.3 to 0.7 by volume, with no copper added, was allowed to stand for 24 hours, and the $H_2O_2$ concentration thereof was measured. At this time, the temperature of the aqueous solution was kept at 0° C., 25° C., or 35° C. The $H_2O_2$ concentration in the aqueous solution allowed to stand for 24 hours is shown in FIG. 6. As shown in FIG. 6, when the temperature of the aqueous solution is 35° C., the $H_2O_2$ concentration in the aqueous solution declined rapidly. The results shown in FIG. 6 show that the temperature of the aqueous solution is preferably lower than 35° C.

Example 3

In Example 3, a description will be given of an exemplary study of the recycling feature of a treatment solution (aqueous solution 12). When a large amount of Cu is included in a core material, or the treatment solution is allowed to stand for a long period of time, the Cu solubility in the solution gradually decreases. This is caused by a decline in the concentrations of $NH_3$ and $H_2O_2$. In particular, since $NH_3$ is a volatile substance, the concentration thereof declines significantly in an open state. Thus, the treatment should be performed in a closed vessel, so that the $NH_3$ concentration is maintained. On the other hand, $H_2O_2$ violently produces oxygen gas and is decomposed upon contact with Cu in an alkaline solution. This occurs in a chain reaction after it is once started, and consequently, the $H_2O_2$ concentration declines relatively rapidly. It follows that the internal pressure of a treatment apparatus increases, which requires the treatment apparatus to have a safety valve.

Figure 7:
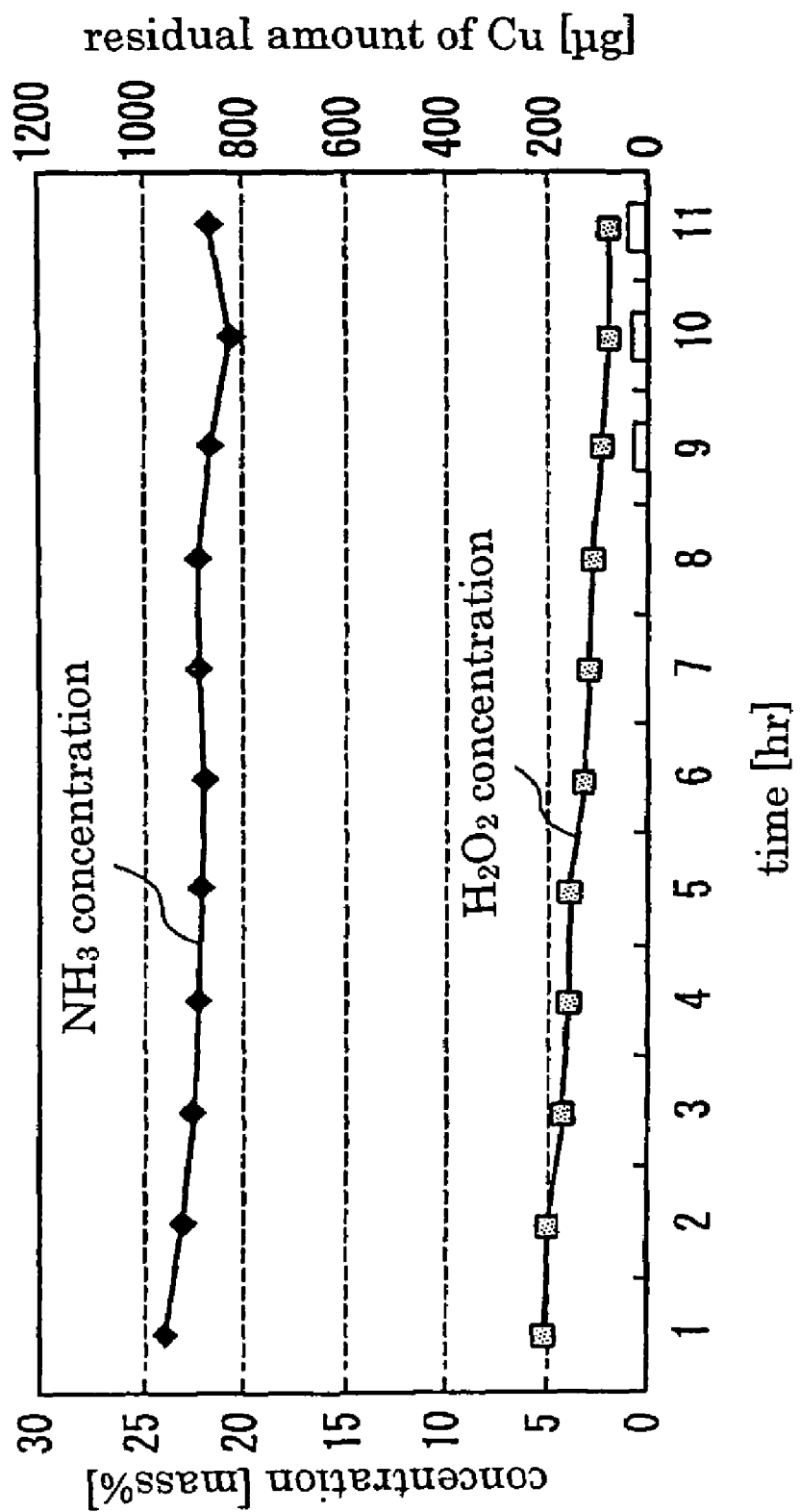
FIG. 7 is a diagram showing changes in characteristics of an aqueous solution used in the manufacturing method of the present invention when a closed-type treatment apparatus is used.
Figure 8:
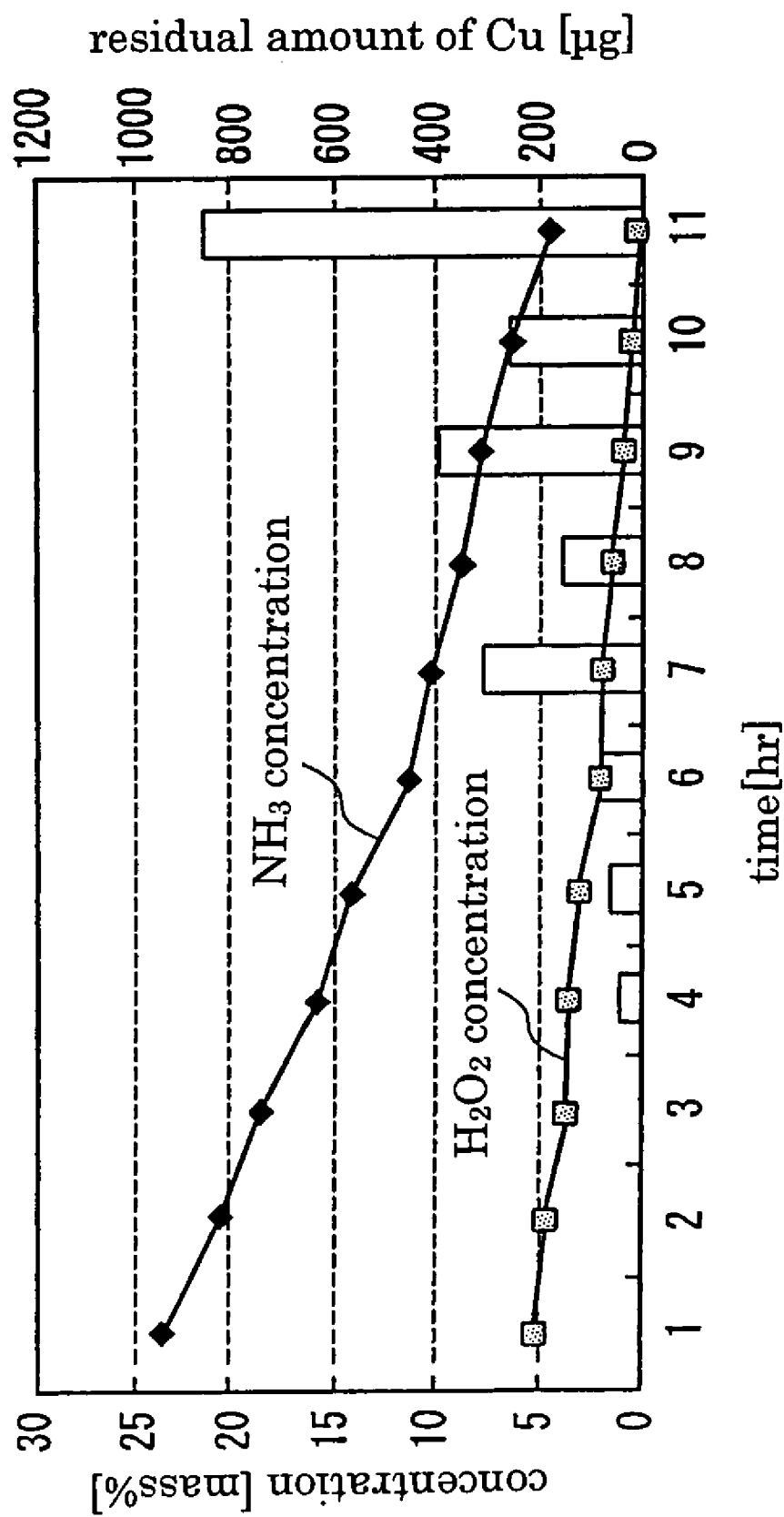
FIG. 8 is a diagram showing changes in characteristics of an aqueous solution used in the manufacturing method of the present invention when an open-type treatment apparatus is used.

A Cu solubility test was performed repeatedly using a closed-type treatment apparatus in which the treatment solution is provided in a closed vessel and an open-type treatment apparatus in which the treatment solution is provided in an open vessel. Then, the concentrations of $NH_3$ and $H_2O_2$ and the Cu solubility were measured with respect to both the treatment apparatuses. As in Example 2, 50 ml of aqueous solution in which aqueous ammonia of 28 mass % and a hydrogen peroxide solution of 35 mass % are mixed at the ratio of 9 to 1 by volume was used. An experiment in which 1 mg of copper is put into the solution (temperature: 25° C.), and the concentrations of $NH_3$ and $H_2O_2$ in the solution and a residual amount of Cu therein in 1 hour are measured was performed eleven times. The results of the experiments using the closed-type treatment apparatus are shown in FIG. 7, and the results of the experiments using the open-type treatment apparatus are shown in FIG. 8. Bar graphs in FIGS. 7 and 8 indicate a residual amount of Cu.

FIGS. 7 and 8 show that the $NH_3$ concentration declined less and the Cu solubility decreased less when the closed-type treatment apparatus was used. Further, it also is found that Cu became less soluble as the $H_2O_2$ concentration declined. On the other hand, in the open-type treatment apparatus, both the concentrations of $NH_3$ and $H_2O_2$ declined, and the Cu solubility also decreased significantly. In particular, when the $H_2O_2$ concentration was equal to or lower than 1 mass %, the Cu solubility decreased significantly.

Further, in the open-type treatment apparatus, the $NH_3$ concentration declines gradually, and accordingly, the ratio between the concentrations of $H_2O_2$ and $NH_3$ becomes larger, resulting in a possibility of bumping. Thus, in view of safety and the Cu solubility, it is preferable to use the closed-type treatment apparatus.

In embodying the present invention, it is preferable that the treatment is performed with the treatment solution provided in a completely closed vessel, so that the $NH_3$ concentration is maintained. Further, it is preferable that the $H_2O_2$ concentration in the treatment solution is monitored, so that the treatment solution is exchanged when the $H_2O_2$ concentration is equal to or lower than 1 mass %. In such manners, the running cost can be reduced.

Figure 9:
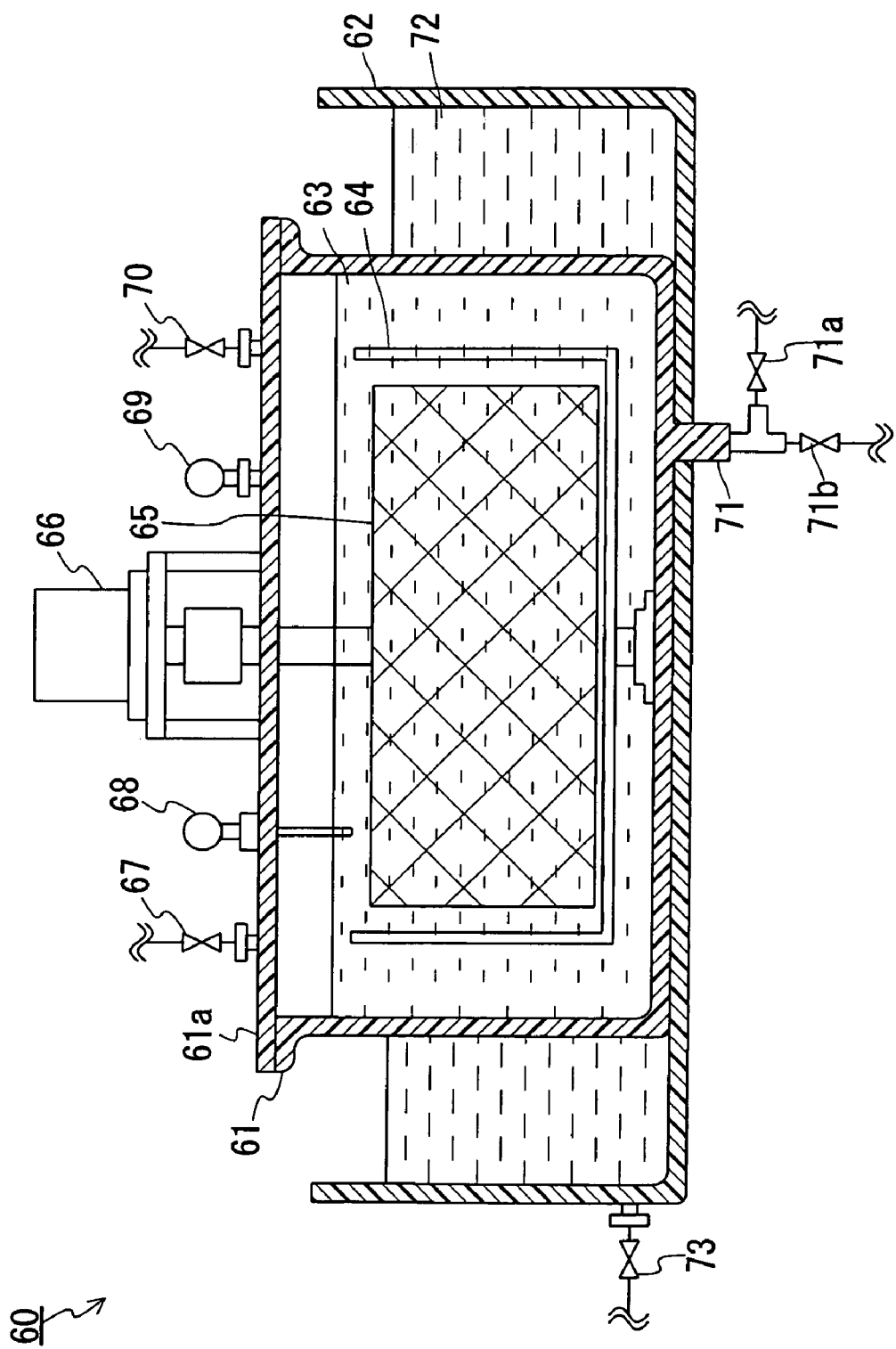
FIG. 9 is a cross-sectional view schematically showing an exemplary treatment apparatus used in the manufacturing method of the present invention.

An exemplary large-scale treatment apparatus that can be used to embody the present invention is shown in FIG. 9. Referring to FIG. 9, a treatment apparatus 60 includes a vessel 61 closed with a top cover 61a and a cooling jacket 62.

A treatment solution 63 (aqueous solution 12), a rotating basket 64, and a workpiece 65 are provided in the vessel 61. A variable motor 66, a safety valve 67, a temperature sensor 68, a pressure gauge 69, a solution inlet 70, and a solution outlet 71 are connected to the outside of the vessel 61. The rotating basket 64 is rotated by the variable motor 66. The treatment solution 63 is applied from the solution inlet 70. A sample collection port 71a for collecting a sample of the treatment solution 63, and a drain 71b for draining the treatment solution 63 into a recovery tank are connected to the solution outlet 71. A water coolant 72 for cooling the treatment solution 63 in the vessel 61 is applied to the cooling jacket 62. The water coolant 72 is drained from a drain port 73 as appropriate.

Since treatment is performed in the closed vessel 61 in the treatment apparatus 60, deterioration of the treatment solution 63 can be suppressed. Further, by using the safety valve 67, the temperature sensor 68, and the pressure gauge 69, the treatment can be performed safely. Furthermore, the sample of the treatment solution 63 is collected from the sample collection port 71a, so that the time to exchange the treatment solution 63 can be determined easily.

Figure 10:
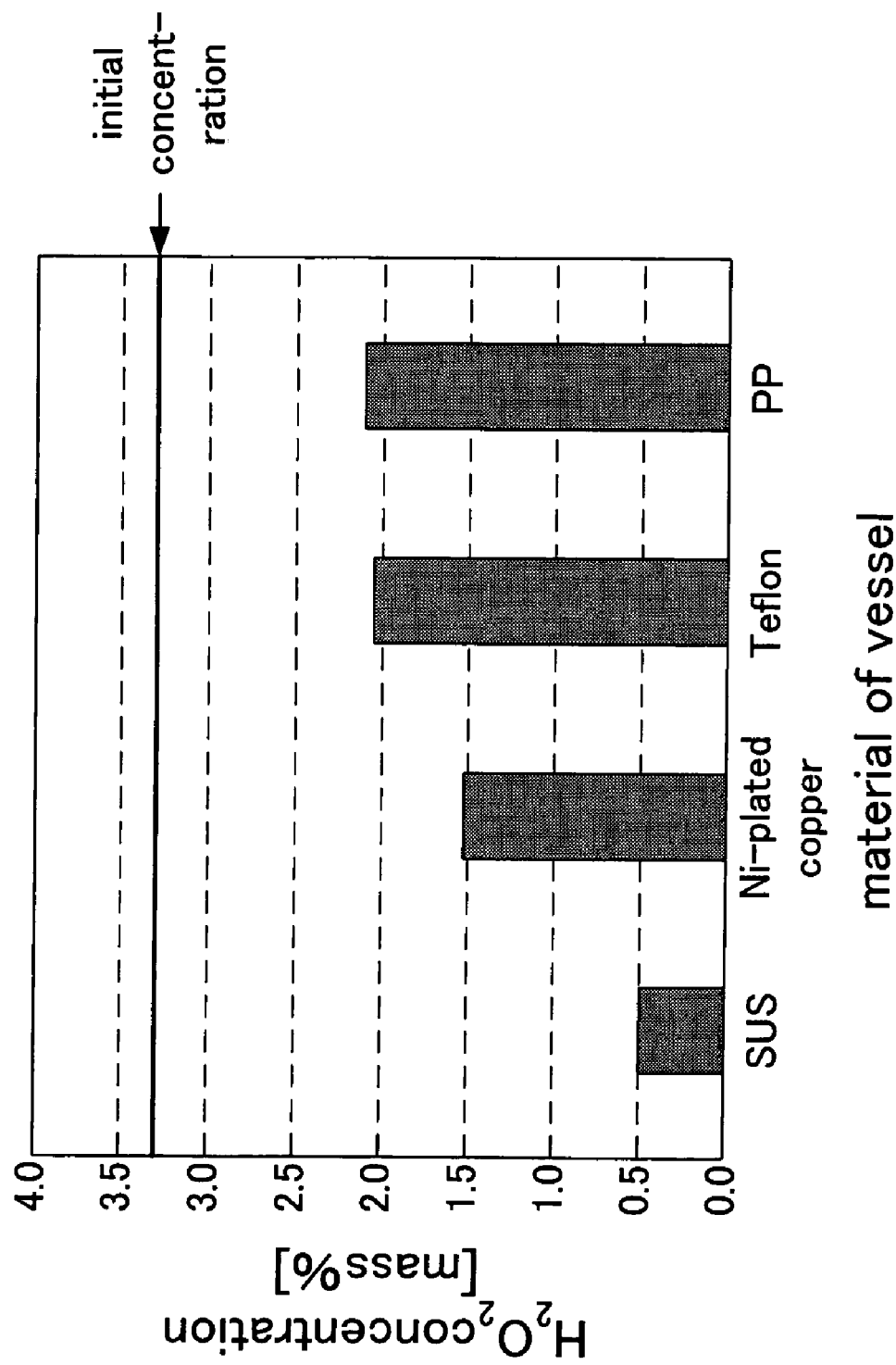
FIG. 10 is a graph showing the relationship between the material of a vessel of a treatment apparatus and the $H_2O_2$ concentration after treatment.

The rate of decline in the $H_2O_2$ concentration in the treatment solution varies depending upon the material of the vessel 61 of the treatment apparatus 60, and thus, it is preferable to use the vessel 61 made of an appropriate material. In order to study effects of the material of the vessel 61, the treatment solution 63 with an initial $H_2O_2$ concentration of 3.3 mass % was put into the vessels 61 made of different materials, and the $H_2O_2$ concentration in 12 hours was measured. The results of the measurements are shown in FIG. 10. As is apparent from FIG. 10, the concentration of residual $H_2O_2$ was higher in, in ascending order, stainless steel (SUS), nickel-plated copper, Teflon (registered trademark), and polypropylene (PP). Consequently, it is preferable to form the vessel 61 using a resin material such as Teflon and polypropylene so as to suppress a decline in the $H_2O_2$ concentration in the treatment solution.

Example 4

In Example 4, a core material 11 was treated with an aqueous solution 12 containing ammonium ions and hydrogen peroxide in different manners, and the rates at which copper was dissolved were compared.

As the core material 11, foamed nickel 75 mm wide, 1000 mm long, and 2 mm thick was used. The core material was coiled around a roller. At this time, 20 mg of a piece of copper was included in the core material intentionally.

Figure 11:
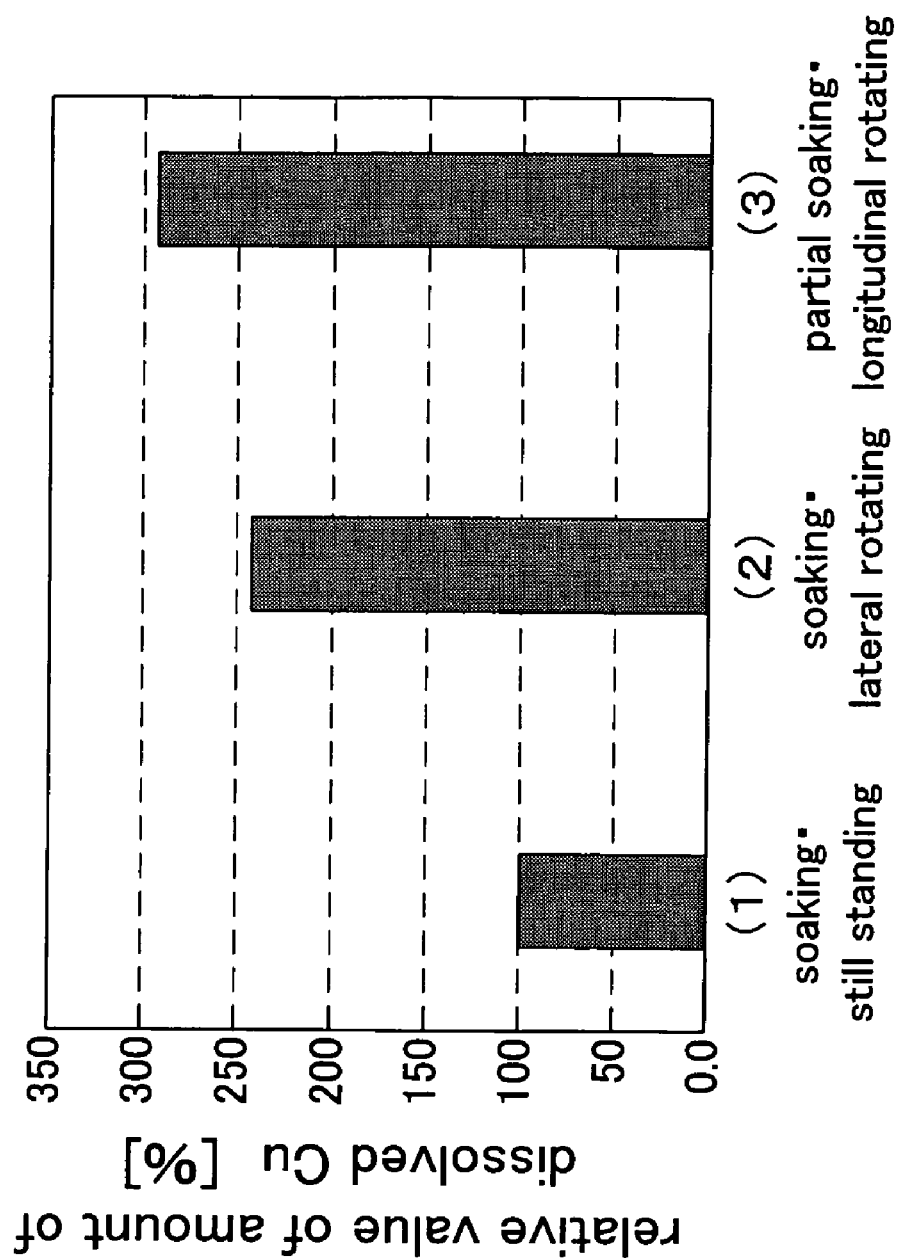
FIG. 11 is a graph showing the relationship between the manner of treating a core material and the amount of dissolved copper.

The core material 11 was treated with the aqueous solution 12 in the following three manners. In the first manner, (1) the core material is soaked and allowed to stand still in the aqueous solution as shown in FIG. 1. In the second manner, (2) the core material is soaked in the aqueous solution as shown in FIG. 1 and is rotated in the aqueous solution in a lateral direction. In the third manner, (3) the core material is rotated in a longitudinal direction with a portion thereof out of the aqueous solution as shown in FIG. 2B. After the treatment for a given length of time, the amounts of dissolved copper were measured. The results of the measurements are shown in FIG. 11. The amount of dissolved copper after the treatment in the first manner (1) is expressed as 100% in the graph of FIG. 11. As is apparent from FIG. 11, the dissolution rate of copper was higher when the core material was rotated in the aqueous solution. When the core material 11 was rotated as shown in FIG. 2B, the dissolution rate of copper was particularly higher.

Example 5

Figure 12:
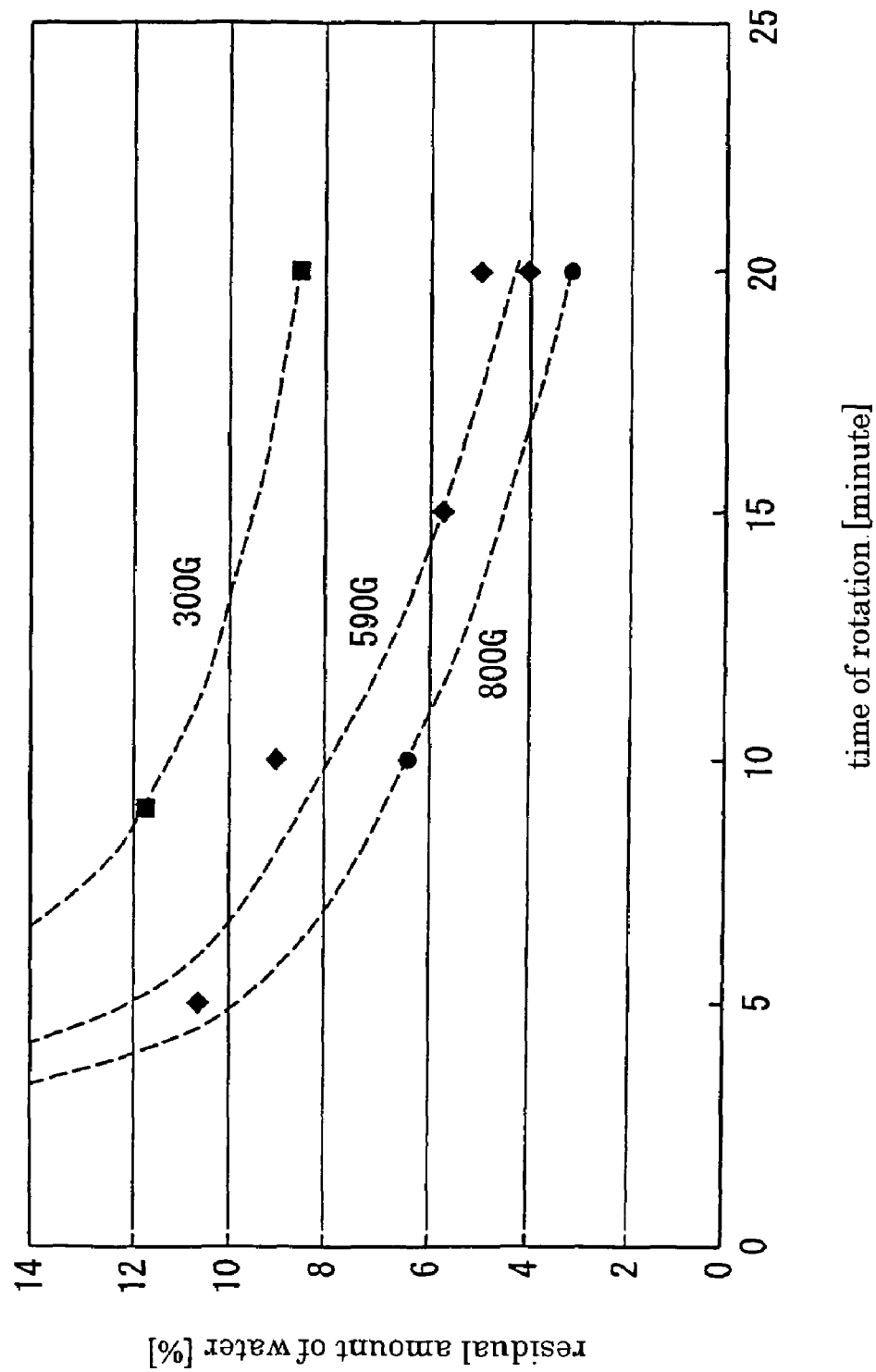
FIG. 12 is a graph showing the relationship between the manner of rotating a core material and the amount of water that was not removed from the core material.

In Example 5, a core material 11 was soaked in an aqueous solution 12, and then the aqueous solution 12 attached to the surface of the core material 11 was removed by centrifugal dehydration as shown in FIG. 3. At this time, the speed of rotation was changed so as to change the acceleration of gravity applied to the core material. The relationship between the time of rotation and a residual amount of water is shown with respect to the cases where the acceleration of gravity applied to the periphery of the core material 11 is 300 G, 590 G, and 800 G. The residual amount of water corresponds to the amount of the aqueous solution 12 attached to the core material 11 after centrifugal dehydration, and is expressed as a value with the amount of aqueous solution 12 attached to the core material 11 before centrifugal dehydration being expressed as 100%. As shown in FIG. 12, the residual amount of water was reduced significantly by centrifugal dehydration for about 10 minutes. At this time, a higher acceleration of gravity achieved a more significant reduction in the amount of residual water.

Example 6

In Example 6, a description will be given of an example in which a nickel metal hydride storage battery was produced using a plate core material produced by the manufacturing method of the present invention.

In Example 6, first, foamed nickel (weight: 600 g/m$^2$, porosity: 95%) was prepared as a core material. In Example 6, three kinds of nickel metal hydride storage batteries (Samples A to C) with different core materials were produced. For Sample C, the core material including no Cu was used as a support for a positive electrode as it was. For Sample B, about 630 μg of a piece of copper was embedded in the core material intentionally, and the core material thus obtained was used as a support for a positive electrode as it was.

A method for manufacturing a core material of Sample A will be described hereinafter. For Sample A, about 630 μg of a core material was embedded in the core material intentionally. Then, the core material thus obtained was treated in the manner of the present invention. To be specific, the core material was soaked in an aqueous solution containing ammonium ions and hydrogen peroxide. In the aqueous solution, aqueous ammonia of 28 mass % and a hydrogen peroxide solution of 35 mass % were mixed at the ratio of 9 to 1 by volume. By soaking the core material in the aqueous solution, the copper in the core material was dissolved.

Then, the core material was washed and dried, whereby a core material for a positive electrode was obtained. Washing was performed by repeating the operation of soaking the core material in pure water for 30 minutes, three times. Drying was performed under vacuum for about 3 hours at a temperature of 120° C. for about 3 hours.

Each of the three kinds of core materials thus obtained was filled with paste containing an active material, whereby a sheet to be a positive electrode was produced. The paste was produced by kneading a powder containing nickel hydroxide as a main component, a metal cobalt powder, a cobalt compound powder, and water. Then, the sheet was dried and rolled, and then, cut into pieces of a predetermined size, resulting in a positive electrode.

Next, paste containing a powder of hydrogen storing alloy was applied to punching metal as a core material for a negative electrode, whereby a sheet to be a negative electrode was produced. Thereafter, the sheet was dried and rolled, and then, cut into pieces of a predetermined size, resulting in a negative electrode.

The positive and negative electrodes thus obtained were coiled with a separator arranged therebetween, so that a plate group was produced. As the separator, a nonwoven fabric made of sulfonated polypropylene and polyethylene was used. The plate group and an electrolyte solution were sealed in a case. In this way, three kinds of nickel metal hydride storage batteries (capacity: 6.5 Ah) were assembled. Then, these nickel metal hydride storage batteries were activated by charging and discharging, resulting in three kinds of nickel metal hydride storage batteries (Samples A to C).

Figure 13:
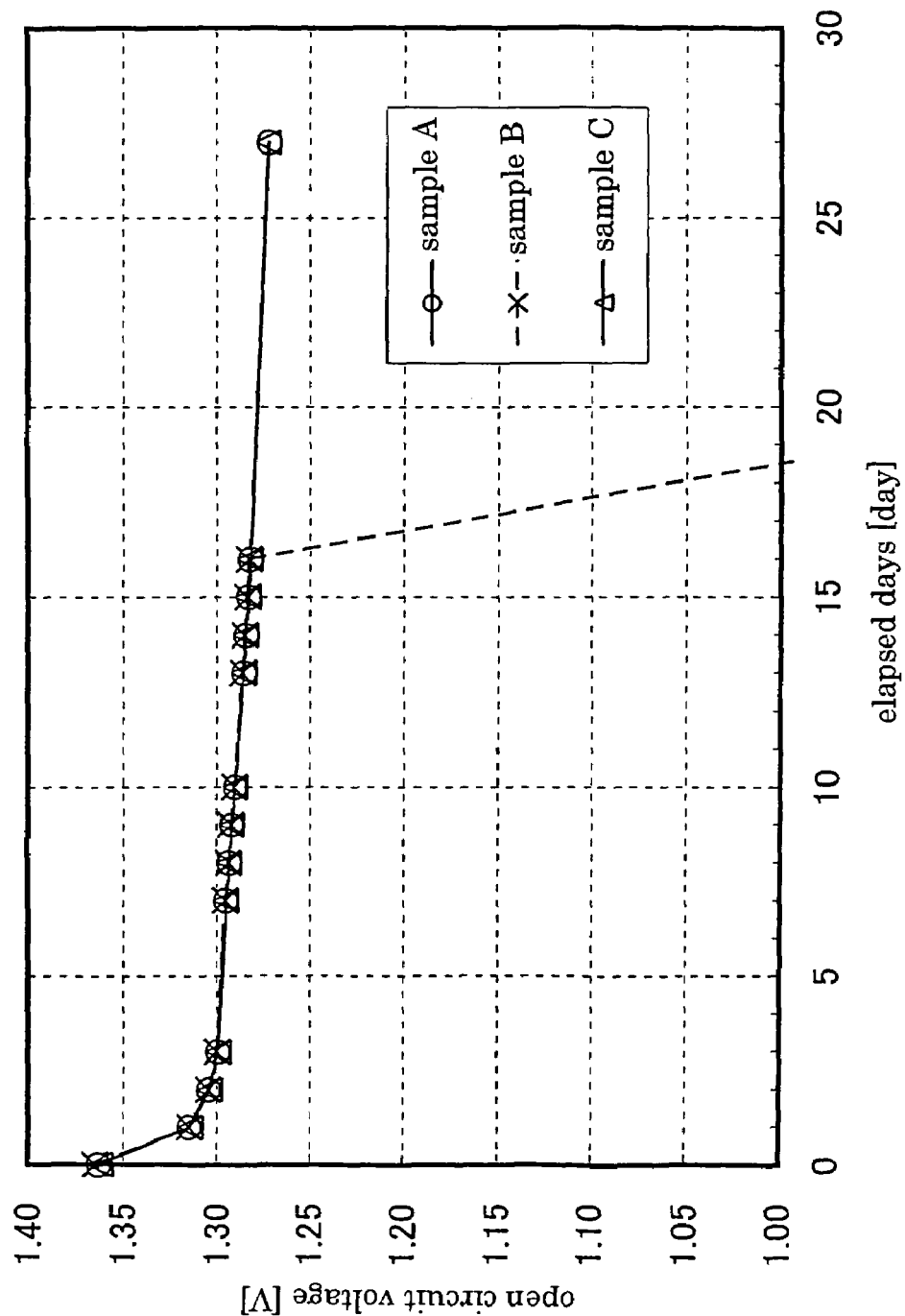
FIG. 13 is a graph showing changes in open circuit voltage (OCV) of a nickel metal hydride storage battery manufactured by the method of the present invention and a nickel metal hydride storage battery manufactured by a conventional method that are allowed to stand.

Thus, eleven Sample A batteries, twelve Sample B batteries, and four Sample C batteries were assembled. Then, these batteries were charged so that their SOC (State Of Charge) reached 30%, and thereafter, they were allowed to stand in an atmosphere of 50° C. Then, changes in open circuit voltage were measured. A typical measurement result is shown in FIG. 13 with respect to the respective samples. The Sample A batteries and the Sample C batteries all showed the same behavior as the typical battery shown in FIG. 13. The Sample B batteries all showed characteristics equal to or lower than those of the typical battery shown in FIG. 13.

As is apparent from FIG. 13, the battery manufactured by the manufacturing method of the present invention provided characteristics posing no problem even when copper was included in the early-stage core material. To the contrary, in Sample B, a short circuit in the positive and negative electrodes was developed before the elapse of 20 days because copper included in the core material was not removed. As described above, copper included in the core material was removed by the manufacturing method of the present invention.

The present invention is applicable to other embodiments unless it departs from the spirit and essential characteristics thereof. The embodiments disclosed in this description are given for illustrative purpose in all respects, and the present invention is not limited thereto. The scope of the present invention is shown not by the above description but by the claims attached hereto, and all modifications within the meaning and scope equal to those of the claims are included therein.

INDUSTRIAL APPLICABILITY

As described above, according to the manufacturing method of the present invention, an alkaline storage battery having higher reliability than a conventional alkaline storage battery can be obtained. The alkaline storage battery manufactured using the manufacturing method of the present invention is suitable for a power source for a motor of an electric vehicle or a hybrid electric vehicle that requires particularly high reliability.

The invention claimed is:

1. A method for manufacturing an alkaline storage battery having a positive electrode including a core material and an active material carried by the core material, comprising:
   manufacturing the core material using a method for manufacturing a plate core material of an alkaline storage battery that is made of nickel or nickel-plated steel, comprising:
   (i) bringing a core material that is made of nickel or nickel-plated steel and includes copper as an impurity into contact with an aqueous solution containing ammonium ions and hydrogen peroxide, so that the copper is dissolved in the aqueous solution; and
   (ii) removing the aqueous solution from a surface of the core material to provide the plate core material of nickel or nickel-plated steel.

2. The method for manufacturing an alkaline storage battery according to claim 1, further comprising assembling the core material into an alkaline storage battery.

3. The method for manufacturing an alkaline storage battery according to claim 1, wherein the core material is soaked in the aqueous solution in the process of (i).

4. The method for manufacturing an alkaline storage battery according to claim 1, wherein at least one selected from the group consisting of ammonia, ammonium chloride, and ammonium acetate is dissolved in the aqueous solution.

5. The method for manufacturing an alkaline storage battery according to claim 1, wherein a temperature of the aqueous solution is in a range of 10° C. to 30° C.

6. The method for manufacturing an alkaline storage battery according to claim 1, wherein the core material is a nickel porous body including copper as an impurity.

7. The method for manufacturing an alkaline storage battery according to claim 1, comprising, before the process of (i):
   coiling the core material around a roller,
   wherein in the process of (i), the core material is brought into contact with the aqueous solution by rotating the roller in a state where the roller is arranged such that a central axis of the roller is horizontal to a surface of the aqueous solution and a portion of the core material is soaked in the aqueous solution.

8. The method for manufacturing an alkaline storage battery according to claim 1,
   wherein the core material is coiled, and
   the process of (ii) includes:
   (ii-1) washing the core material with a rinsing liquid;
   (ii-2) removing the rinsing liquid from the surface of the core material by rotating the core material; and
   (ii-3) drying the core material.

* * * * *